(12) United States Patent
Kimura et al.

(10) Patent No.: US 8,722,252 B2
(45) Date of Patent: May 13, 2014

(54) CURRENT CARRYING BLOCK FOR RESISTANCE WELDING, AND METHOD FOR MANUFACTURING SEALED BATTERY AND SEALED BATTERY EACH USING THE CURRENT CARRYING BLOCK

(75) Inventors: Takenori Kimura, Naruto (JP); Taiki Kamifuji, Tokushima (JP); Kousuke Yamamoto, Kasai (JP); Yoshinori Yokoyama, Tokushima (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 603 days.

(21) Appl. No.: 12/878,479

(22) Filed: Sep. 9, 2010

(65) Prior Publication Data
US 2011/0076569 A1 Mar. 31, 2011

(30) Foreign Application Priority Data

Sep. 30, 2009 (JP) ................................. 2009-227817
Jun. 30, 2010 (JP) ................................. 2010-149609

(51) Int. Cl.
*H01M 2/16* (2006.01)
*H01M 4/02* (2006.01)
*H01M 6/00* (2006.01)
*H01M 10/00* (2006.01)

(52) U.S. Cl.
USPC ............ 429/246; 429/122; 429/209; 429/247

(58) Field of Classification Search
USPC ...................................... 429/246
See application file for complete search history.

(56) References Cited

U.S. PATENT DOCUMENTS

| 5,155,320 | A  | * | 10/1992 | Simmons ....................... 219/120 |
| 6,027,831 | A  |   | 2/2000  | Inoue et al. |
| 6,515,449 | B1 |   | 2/2003  | Thomas et al. |
| 7,807,285 | B1 |   | 10/2010 | Berg et al. |
| 2001/0021471 | A1 |   | 9/2001 | Xing et al. |

(Continued)

FOREIGN PATENT DOCUMENTS

| CN | 101335339 A | 12/2008 |
| CN | 101536180 A | 9/2009 |

(Continued)

OTHER PUBLICATIONS

Search Report dated Feb. 29, 2012, issued in corresponding European Application No. 11173780.

(Continued)

*Primary Examiner* — Barbara Gilliam
*Assistant Examiner* — Steven Scully
(74) *Attorney, Agent, or Firm* — Westerman, Hattori, Daniels & Adrian, LLP

(57) ABSTRACT

In a sealed battery, a metal current carrying block 24A having a protrusion 24*b* on each of the two opposing faces is placed between positive or negative electrode substrate exposed portions that are divided into two so as to bring the protrusion 24*b* on each of the two opposing faces into contact with the positive or negative electrode substrate exposed portions that are stacked, a pair of electrodes 31 and 32 for resistance welding are brought into contact with positive electrode collector members 16 or negative electrode collector members that are each placed on the outermost surfaces of the positive electrode substrate exposed portions 14 or negative electrode substrate exposed portions, and resistance welding is performed with pressure applied between the pair of electrodes 31 and 32 for resistance welding.

11 Claims, 10 Drawing Sheets

(56) References Cited

U.S. PATENT DOCUMENTS

| | | |
|---|---|---|
| 2002/0146620 A1 | 10/2002 | Connell |
| 2009/0004561 A1* | 1/2009 | Nansaka et al. .............. 429/185 |
| 2009/0004562 A1* | 1/2009 | Inagaki et al. ................ 429/185 |
| 2009/0104525 A1 | 4/2009 | Nakagawa et al. |
| 2010/0006315 A1 | 1/2010 | Kumatani et al. |
| 2010/0287763 A1 | 11/2010 | Tsuchiya et al. |

FOREIGN PATENT DOCUMENTS

| | | | |
|---|---|---|---|
| JP | 4-501235 A | 3/1992 | |
| JP | 2001-160387 A | 6/2001 | |
| JP | 2003-249423 * | 9/2003 | ............. H01G 9/058 |
| JP | 2003-249423 A | 9/2003 | |
| JP | 2005-216825 A | 8/2005 | |
| JP | 2006-310254 A | 11/2006 | |
| JP | 2007-053002 A | 3/2007 | |
| JP | 2009-176482 A | 8/2009 | |
| WO | 90/04489 A1 | 5/1990 | |

OTHER PUBLICATIONS

U.S. Office Action dated Aug. 27, 2012, issued in related U.S. Appl. No. 13/218,697.

Office Action dated Dec. 26, 2013, issued in corresponding Chinese application No. 201010283696.5, w/English translation.

Japanese Office Action dated Feb. 18, 2014, issued in corresponding Japanese Patent Application No. 2010-149609 (3 pages).

* cited by examiner

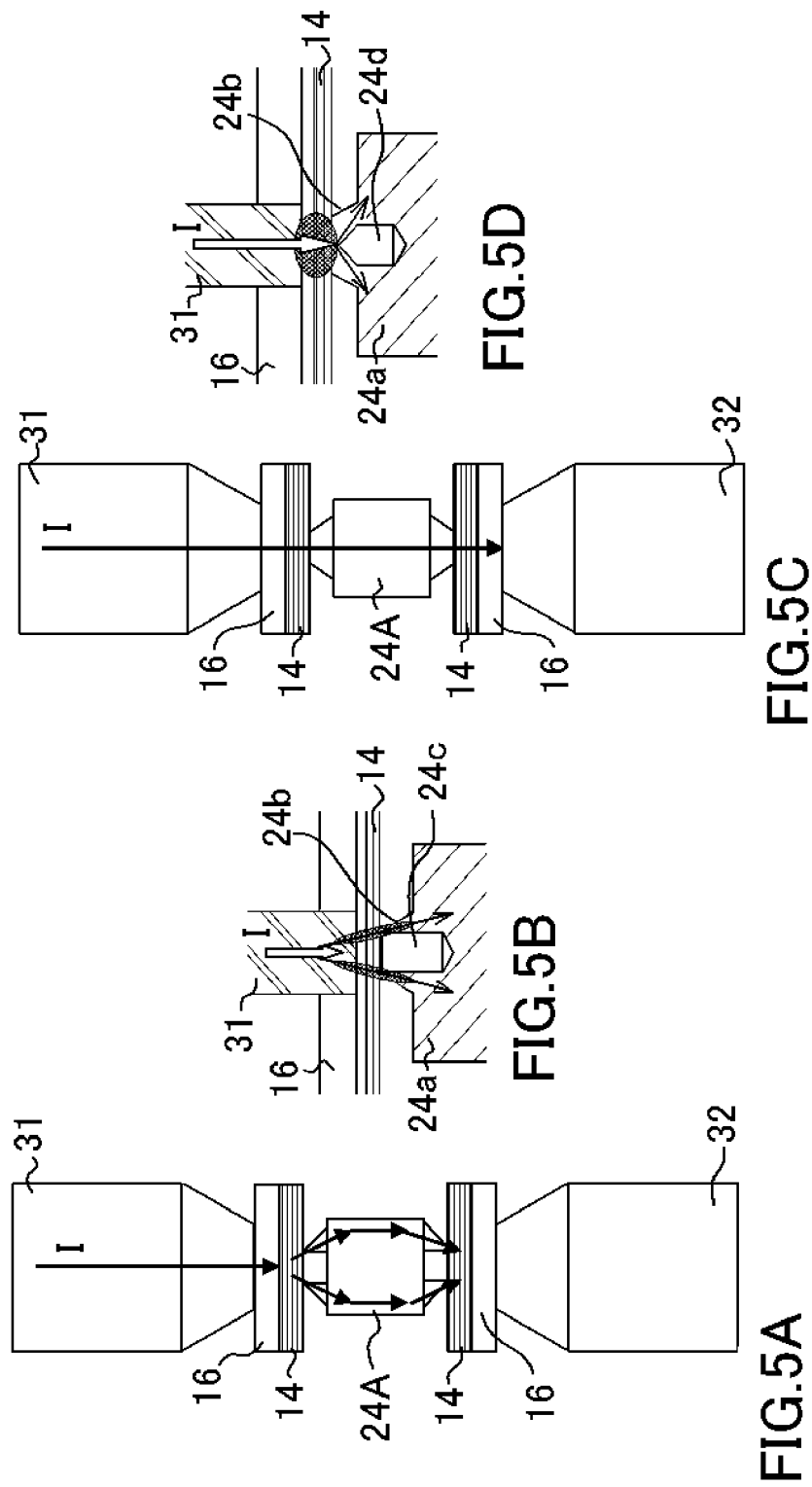

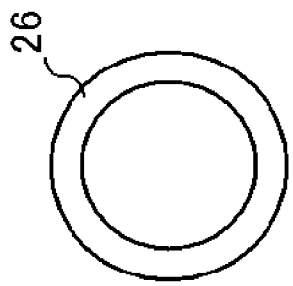
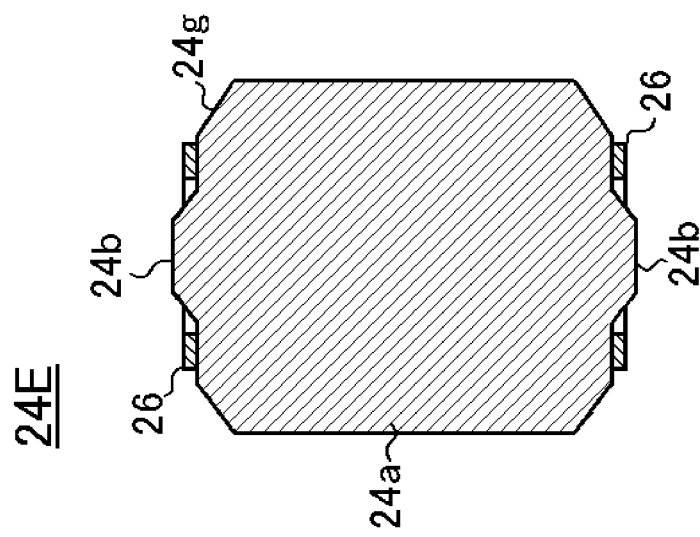
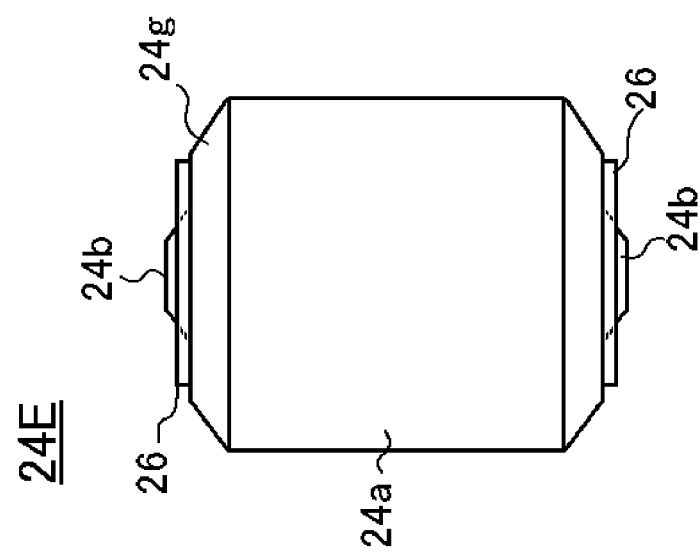

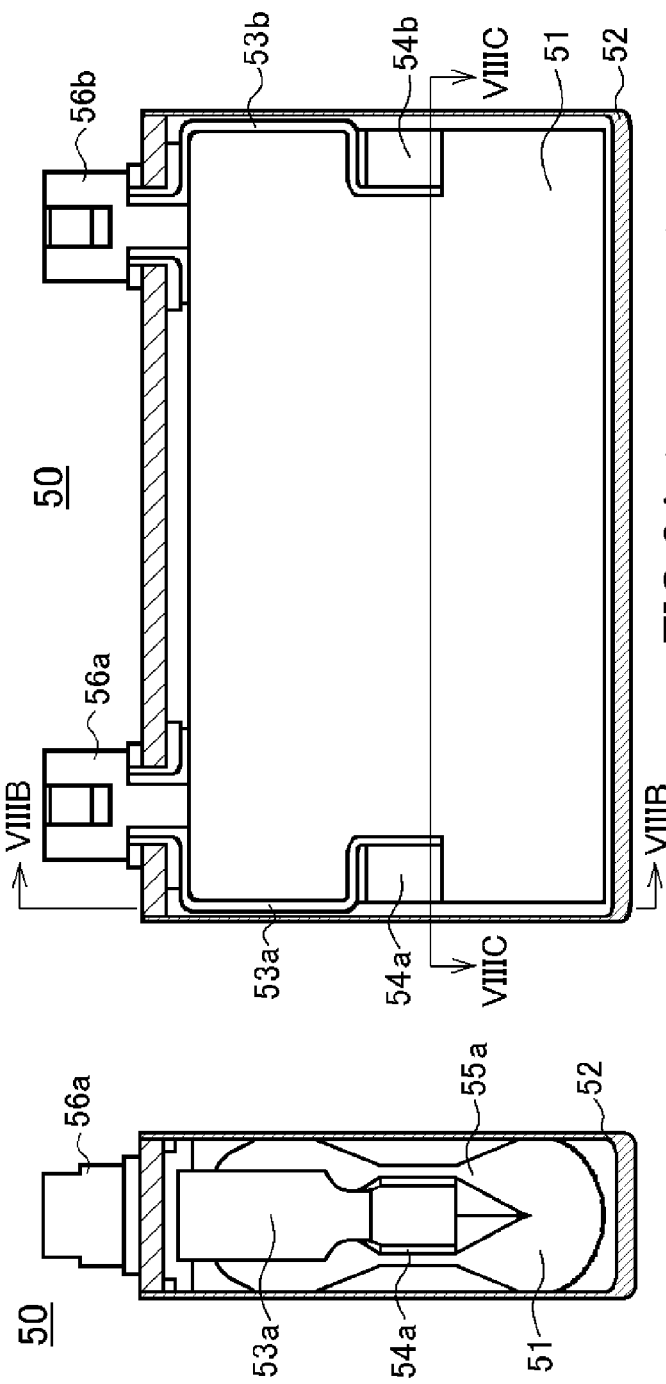
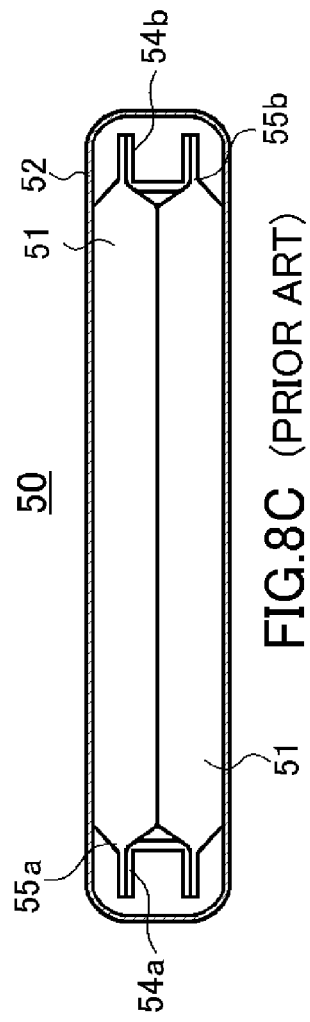
FIG.8A (PRIOR ART)
FIG.8B (PRIOR ART)
FIG.8C (PRIOR ART)

CURRENT CARRYING BLOCK FOR RESISTANCE WELDING, AND METHOD FOR MANUFACTURING SEALED BATTERY AND SEALED BATTERY EACH USING THE CURRENT CARRYING BLOCK

TECHNICAL FIELD

The present invention relates to a current carrying block for resistance welding by which, in a sealed battery having positive electrode substrate exposed portions and negative electrode substrate exposed portions that are stacked and divided into two, the resistance between respective substrate exposed portions and a collector member can be lowered and each of the substrate exposed portions and the collector member can be stably resistance-welded in a single welding step, and relates to a method for manufacturing a sealed battery and a sealed battery, each using the current carrying block.

BACKGROUND ART

Recently, the environmental movement has been active, and the exhaust regulations of exhaust gas such as carbon dioxide gas that causes the global warming are becoming more rigorous. Thus, in the car industry, electric vehicles (EVs) and hybrid electric vehicles (HEVs) have been actively developed in place of automobiles using fossil fuels such as gasoline, diesel oil, and natural gas. A nickel-hydrogen secondary battery or a lithium ion secondary battery is used as the batteries for such EVs and HEVs. Recently, nonaqueous electrolyte secondary batteries such as a lithium ion secondary battery have been often used because these provide a battery with lightweight and high capacity.

The batteries for EVs and HEVs are required not only to be environmentally friendly but also to achieve the basic performance of automobiles, that is, highly developed traveling performance such as acceleration performance and hill-climbing performance. In order to achieve such requests, the battery is required to have both an increased capacity and high power output. Generally, for the nonaqueous electrolyte secondary battery for EVs and HEVs, a prismatic sealed battery that includes an electric power-generating element in a prismatic outer can made of an aluminum-based metal is often used. However, the internal resistance of the battery is required to be reduced as much as possible because a large current flows in the battery when it is discharged at high power. Thus, various improvements have been achieved in order to prevent welding defects between the substrate of the electrode sheet and the collector member to lower the internal resistance in the electric power-generating element of the battery.

Examples of the method for electrically connecting the substrate of the electrode sheet and the collector member in the electric power-generating element to collect electrical current include a mechanical crimping method and welding method. Among them, the welding method is suitable for collecting electric current in a battery that requires to have a high power output because the resistance is readily lowered as well as the weld is less changed with time. Furthermore, in order to lower the resistance in the lithium ion secondary battery, aluminum or an aluminum alloy is used as the materials for the substrate of the positive electrode sheet and collector member, and copper or a copper alloy is used as the materials for the substrate of the negative electrode sheet and collector member. However, characteristics of the aluminum, aluminum alloy, copper, and copper alloy include a small electric resistance and large thermal conductivity, requiring a very large amount of energy is required for the welding.

The following methods are conventionally known as welding methods used between the substrate of the electrode sheet and the collector member in the electric power-generating element.

(1) Laser welding method (see JP-A-2001-160387)
(2) Ultrasonic welding method (see JP-A-2007-053002)
(3) Resistance welding method (see JP-A-2006-310254)

In the laser welding method, a high-energy laser beam is required because the aluminum, aluminum alloy, copper, and copper alloy that are the metals to be welded have a high reflectivity of about 90% with respect to the YAG (yttrium-aluminum-garnet) laser beam widely used for metal welding. Furthermore, the laser welding method presents other issues such as when the aluminum, aluminum alloy, copper, or copper alloy is laser-welded, the weldability greatly varies depending on the surface conditions, and the occurrence of spattering is unavoidable, similar to laser welding of other materials.

In the ultrasonic welding, a large amount of energy is also required because the aluminum, aluminum alloy, copper, and copper alloy that are the metals to be welded have large thermal conductivity, and furthermore, the positive electrode active material and negative electrode active material can possibly fall off due to the ultrasonic vibration during welding. Thus, in the invention disclosed in JP-A-2007-053002, the electrode assembly as the electric power-generating element is compressed during ultrasonic welding so that the dropped active material does not fall into the electrode assembly.

In addition, the resistance welding presents issues such as a high current is required to be input in a short period because the aluminum, aluminum alloy, copper, and copper alloy as the metals to be welded have a small electric resistance and large thermal conductivity, the electrode rod for resistance welding and the collector member are sometimes melted together during resistance welding, and melting or spark occurs at locations other than the welded part.

As discussed above, though each of the three welding methods has advantages and disadvantages, considering productivity and economy, the resistance welding method that is widely used as a conventional method for welding metals will preferably be employed. However, the electrode assembly for a lithium ion secondary battery and the like for EVs and HEVs has a structure in which the positive electrode sheet and the negative electrode sheet are wound or stacked with a separator interposed therebetween. Then, the substrate exposed portions of the positive electrode sheet are placed on one side and those of the negative electrode sheet are placed on the other side, then the substrate exposed portions of the positive electrode sheet are stacked and welded to the positive electrode collector member, and the substrate exposed portions of the negative electrode sheet are stacked and welded to the negative electrode collector member. When the lithium ion secondary battery and the like for EVs and HEVs has a large capacity, the stacking amount of each of the positive electrode substrate exposed portions and negative electrode substrate exposed portions becomes very large.

Thus, a great deal of welding energy is required in order to reliably resistance-weld each of the collector members made of aluminum or an aluminum alloy to the substrate exposed portions of the positive electrode sheet, and the collector members made of copper or a copper alloy to the substrate exposed portions of the negative electrode sheet. Moreover, when a large welding energy is applied during resistance welding, the amount of spattered particles increases thereby increasing the possibility that the particles migrate to the electrode assembly resulting in an internal short circuit.

In contrast, JP-A-2003-249423 discloses the storage element in which, in the electrode assembly in which the positive electrode sheet and the negative electrode sheet are flatly wound with a separator interposed therebetween, each of the substrate exposed portions of the electrodes is divided into two and welded to the collector member in order to reduce each width of the substrate exposed portions, which are extended from the separator, of the electrodes. Hereinafter, the structure of the storage element disclosed in JP-A-2003-249423 will be described with reference to FIGS. 8A to 8C and 9. FIG. 8A is a cross-sectional view showing an electric double layer capacitor as the storage element disclosed in JP-A-2003-249423, FIG. 8B is a cross-sectional view taken along the line VIIIB-VIIIB of FIG. 8A, and FIG. 8C is a cross-sectional view taken along the line VIIIC-VIIIC of FIG. 8A. Furthermore, FIG. 9 is a diagram showing a welding process between the substrate exposed portion of the electrode and the collector member in FIGS. 8A to 8C.

As shown in FIGS. 8A to 8C, the storage element 50 includes a wound electrode assembly 51 in which a positive electrode sheet and a negative electrode sheet are flatly wound with a separator interposed therebetween (not shown), and the wound electrode assembly 51 is placed in a prismatic aluminum outer can 52. Furthermore, a positive electrode collector member 53a and a negative electrode collector member 53b of the storage element 50 include U-shaped wing members 54a and 54b on one end, respectively. The U-shaped wing members 54a and 54b are connected to the substrate exposed portion 55a of the positive electrode sheet and the substrate exposed portion 55b of the negative electrode sheet, respectively. The other end of each of the collector members is connected to a positive electrode terminal 56a or a negative electrode terminal 56b. In the storage element 50, the substrate exposed portions 55a of the positive electrode sheet are gathered and divided into two, and each is welded to each of the two sites on the outer side of the U-shaped wing member 54a, as well as the substrate exposed portions 55b of the negative electrode sheet are divided into two, and each is welded to each of the two sites on the outer side of the U-shaped wing member 54b.

The welding is performed by ultrasonic welding as described below. For example, for the positive electrode sheet, as shown in FIG. 9, one of the two-divided substrate exposed portions 55a of the positive electrode sheet is placed on the outer side of the U-shaped wing member 54a, a horn 57 of an ultrasonic welding equipment (not shown) is brought into contact with the outer surface of the substrate exposed portion 55a, an anvil 58 is placed on the inner side of the U-shaped wing member 54a, and then ultrasonic welding is performed. Similar ultrasonic-welding is performed on the other two-divided substrate exposed portion 55a of the positive electrode sheet and on the negative electrode sheet.

The invention disclosed in JP-A-2003-249423 provides the effect of good volumetric efficiency of the storage apparatus because the exposed width of both the positive electrode substrate exposed portion and the negative electrode substrate exposed portions can be reduced. However, the invention presents an issue in being a complex fabrication apparatus. For example, multiple welding steps are required in order to weld the positive electrode collector member or the negative electrode collector member to the positive electrode sheet or the negative electrode sheet, respectively, as well as opening spaces being required at the central part of the wound electrode assembly in order to place each U-shaped wing member of the positive electrode collector member and the negative electrode collector member, and an anvil is required to be placed inside of the U-shaped wing member during ultrasonic welding.

Furthermore, JP-A-2003-249423 describes that the ultrasonic welding method is specifically preferably employed in the step for connecting the electrode sheet. However, in Example, the number of windings is 16 (eight for one of the two-divided sheets) and the stacking thickness is 320 μm. In contrast, in a large capacity sealed battery such as the lithium ion secondary battery for EVs and HEVs, the number of each of the stacked positive and negative electrode substrate exposed portions is far larger than in the case of the invention disclosed in JP-A-2003-249423 and the stacking thickness is far larger.

Thus, in order to stably weld the stacked positive and negative electrode substrate exposed portions to the collector members by the ultrasonic welding method, a large capacity sealed battery such as the lithium ion secondary battery for EVs and HEVs requires a high pressure for closely contacting each of the stacked positive and negative electrode substrate exposed portions to the collector members, and a large amount of energy is required so that the ultrasonic vibration reaches the other end of each of the stacked positive and negative electrode substrate exposed portions. In the invention disclosed in JP-A-2003-249423, because the anvil placed inside the U-shaped collector member has to receive the pressure and the ultrasonic wave energy, the anvil requires a corresponding rigidity. Moreover, it is technically very difficult to find a condition in which the welding is stably performed both under high pressure and using an anvil of a size capable of being inserted inside the U-shaped collector member.

On the other hand, when the two-divided positive electrode sheets or negative electrode sheets are resistance-welded, a method of separately welding each of the divided sheets and a method of series spot welding for simultaneously welding the divided sheets are discussed. Here, the series spot welding is preferred for reducing the amount of welding repetitions. As shown in FIG. 10, when members to be welded 73 and 74 are welded at two points on the same axis as that of a pair of electrode rods 71 and 72 for resistance welding, a conventional series spot welding art mainly employs a method in which an U-shaped welding member 75 is interposed therebetween to weld the upper and lower parts of the U-shaped welding member 75. The method is widely used because the U-shaped welding member 75 is readily prepared from a metal plate and a projection for easy and stabilized resistance welding is readily prepared. However, the method has an issue in requiring complex welding equipment. For example, a pressure receiver 76 is required inside the U-shaped welding member 75 in order to prevent the deformation of the U-shaped welding member by the pressure from the welding electrode rods 71 and 72, and a metal block is required for carrying current.

SUMMARY

An advantage of some aspects of the invention is to provide a current carrying block for resistance welding by which the resistance between positive and negative electrode substrate exposed portions that are stacked and divided into two and a collector member can be lowered and each of the substrate exposed portions and the collector member can be stably resistance-welded in a single welding step, and to provide a method for manufacturing a sealed battery and a sealed battery using the current carrying block.

According to an aspect of the present invention, a current carrying block for resistance welding includes a first protrusion on one face of a metal block and a second protrusion on another face, with the faces opposing each other.

With the current carrying block for resistance welding of the invention, the metal block is slightly deformed when pressure is applied during resistance welding. Moreover, because the protrusion is formed on each of the two opposing faces of the metal block, the protrusion functions as a projection during resistance welding, thus the current is concentrated to readily generate heat, and consequently weldability becomes stable, resulting in a good quality welded portion. Here, the current carrying block for resistance welding of the invention may have any less deformable shape such as a column, prismatic, or elliptical column shape.

Furthermore, in the current carrying block for resistance welding of the invention, it is preferable that a corner between each of the two opposing faces and a side face of the metal block be chamfered.

With the current carrying block for resistance welding of the invention, a chamfered corner between each of the two opposing faces and the side face of the metal block results in the block causing less damage to the portion to be welded and can be readily brought into contact with the portion to be welded to improve the weldability, even when the current carrying block is brought into contact with a soft portion to be welded, such as when the block is inserted between the stacked substrate exposed portions.

Furthermore, in the current carrying block for resistance welding of the invention, it is preferable that the chamfered face have a flat surface.

In the current carrying block for resistance welding of the invention, the chamfered face could have both a curved surface and a flat surface. However, when the chamfered face has a flat surface, the portion between the chamfered face of the corner and the face having the protrusion always has an obtuse angle with respect to the portion to be welded. Thus, when the current carrying block for resistance welding of the invention is brought into contact with an article to be welded, the article to be welded readily comes in contact with the protrusion to improve the weldability.

In this case, it is preferable that the two faces having the protrusions have flat portions that are parallel to each other.

In the current carrying block for resistance welding, if the corner between each of the two opposing faces and the side face is chamfered, the current carrying block is readily deformed by the pressure from the electrodes for resistance welding during resistance welding when the two faces having the protrusions have no flat portion. In addition, a part of the protrusion that is melted during resistance welding or a part of the melted member for welding readily flows to the side face of the current carrying block. In contrast, in the current carrying block for resistance welding of the invention, the current carrying block is less deformed by the pressure from the electrodes for resistance welding during resistance welding because the two faces having the protrusions have the flat portions, and furthermore, a part of the protrusion that is melted and deformed during resistance welding or a part of the melted member for welding can remain on the flat portion to prevent the melt from flowing toward the side face of the current carrying block, and moreover, the flat portion comes in contact with the member to be welded to stabilize the current carrying block. Therefore, with the current carrying block for resistance welding of the invention, a resistance-welded portion with high reliability can be obtained.

Furthermore, in the current carrying block for resistance welding of the invention, it is preferable that the protrusions each have a truncated cone or pyramid shape.

With the current carrying block for resistance welding of the invention, heat is more readily generated, weldability becomes more stable, and moreover, the welded portion obtains better quality because current is concentrated during resistance welding at the tip of the protrusion having the truncated cone shape or the truncated pyramid shape and the protrusion works as a projection.

Furthermore, in the current carrying block for resistance welding of the invention, it is preferable that the protrusions each have a portion defining an opening.

When an opening is not formed in the protrusion, the temperature is less increased at the tip of the protrusion because the heat generated in the protrusion diffuses throughout the metal block. In contrast, when the protrusion has a portion defining an opening, the temperature at and near the protrusion is locally increased and thus the good welding and connection can be obtained because current is likely to be concentrated at the protrusion according to the opening to readily generate the heat intensively at the protrusion, and because the heat generated at the protrusion is prevented from diffusing throughout the metal block. In addition, the current during resistance welding is once dispersed around the opening in the protrusion and then concentrated at the central part of the current carrying block when the protrusion has a portion defining an opening because a stronger pressure during resistance welding collapses the opening in the protrusion to form a cavity inside the protrusion as well as the collapsed part is centered in the protrusion. Therefore, the heat can be sufficiently generated not only in the protrusion but also at the central part of the protrusion, and enabling good resistance welding to be performed.

Furthermore, in the current carrying block for resistance welding of the invention, it is preferable that the opening be extended to reach inside the metal block.

In the case where the opening is extended to reach inside the metal block, even when the electrode rods for resistance welding strongly sandwich the protrusion during welding to collapse the tip, the cavity more certainly exists inside the protrusion or the metal block. Accordingly, the heat generated in the protrusion is prevented from diffusing and thus the protrusion and the surrounding area can locally reach high temperature. Furthermore, the cavity existing inside the metal block near the protrusion can efficiently prevent the heat generated in the protrusion from diffusing throughout the metal block. Therefore, better and more reliable resistance welding can be performed by using the current carrying block for resistance welding of the invention.

Furthermore, in the current carrying block for resistance welding of the invention, the opening may penetrate the metal block.

The current carrying block for resistance welding, except for the protrusion, is preferably less deformed even by the pressure during resistance welding and the current carrying block for resistance welding preferably has small resistance. With the current carrying block for resistance welding of the invention, the metal block has a cylinder shape because the opening penetrates the metal block. Therefore, a current carrying block that is lightweight as well as readily providing the above effect can be obtained.

Furthermore, in the current carrying block for resistance welding of the invention, it is preferable that an insulating seal material be annularly formed around the protrusions.

In the case where the insulating seal material is annularly formed around the protrusion of the current carrying block for resistance welding, particles with high temperature can be captured between the insulating seal material and the protrusion, or by the insulating seal material itself even when high-temperature spattered particles are generated during resistance welding. Therefore, with the current carrying block for resistance welding of the invention, the damage to the article for welding or the adverse effect on the periphery caused by high-temperature spattered particles with can be inhibited because the high-temperature spattered particles generated during resistance welding are less dispersed around the current carrying block.

Here, the insulating seal material is preferably made of an insulating thermally depositing resin in order to improve the characteristics for capturing the high-temperature spattered particles. When the insulating thermally depositing resin is used as the insulating seal material, the spattered particles are readily captured in the solid insulating thermally depositing resin because the high-temperature spattered particles generated during resistance welding partially melt the solid insulating thermally depositing resin to lose the heat and are rapidly cooled to reduce the temperature. Here, it is rare the entire insulating thermally depositing resin is melted all at once because the time for applying the current is short and the area where the current is applied is small during resistance welding. Thus, the spattered particles generated during resistance welding are far less dispersed from the insulating thermally depositing resin. Here, the insulating thermally depositing resin desirably has a deposition temperature of about 70 to 150° C. and a melting temperature of 200° C. or more.

Furthermore, in the current carrying block for resistance welding of the invention, it is preferable that the insulating seal material have a height smaller than that of the protrusions.

The protrusion of the current carrying block jams into the portion to be welded because the article to be welded is pressed toward the current carrying block by the electrode for resistance welding during resistance welding. With the current carrying block for resistance welding of the invention, due to the insulating seal material having a height smaller than that of the protrusion, the insulating seal material comes in contact with the article to be welded during resistance welding, and thus the high-temperature spattered particles do not splash out to the periphery of the current carrying block. In addition, the article to be welded comes in contact with the insulating seal material even when the article to be welded is soft, and thus excess deformation of the article to be welded is rarely generated.

According to another aspect of the invention, a method for manufacturing a sealed battery includes:

(1) winding or stacking a positive electrode sheet and a negative electrode sheet with a separator interposed therebetween to make a flat electrode assembly having a plurality of positive electrode substrate exposed portions at one end and a plurality of negative electrode substrate exposed portions at the other end, (2) dividing at least one of the stacked positive electrode substrate exposed portions and the stacked negative electrode substrate exposed portions into two, (3) placing a collector member or a welding receiving member on each of the outermost surfaces of the two-divided substrate exposed portions, and placing a current carrying block including a first protrusion on one face of a metal block and a second protrusion on another face, the faces opposing each other, between the two-divided substrate exposed portions to bring each of the protrusions on the two opposing faces into contact with each of the two-divided substrate exposed portions, (4) bringing a pair of electrodes for resistance welding into contact with the collector members or the welding receiving members placed on both of the outermost surfaces of the two-divided substrate exposed portions, and (5) performing resistance welding with pressure applied between the pair of electrodes for resistance welding.

The method for manufacturing a sealed battery of the invention includes dividing at least one of the stacked positive electrode substrate exposed portions and the stacked negative electrode substrate exposed portions into two, placing the collector member or the welding receiving member on each of the outermost surfaces of the two-divided substrate exposed portions, placing the current carrying block including the protrusion on each end of the metal block between the two-divided substrate exposed portions so as to bring the protrusion on each end into contact with each of the two-divided substrate exposed portions, bringing a pair of electrodes for resistance welding into contact with the collector members or the welding receiving members placed on both of the outermost surfaces of the substrate exposed portions, and performing resistance welding with pressure applied between the pair of electrodes for resistance welding. In resistance welding, the substrate exposed portions, the current carrying block, the substrate exposed portions, to the collector member or the welding receiving member, the substrate exposed portions and the collector members of one of the electrode sheets can be welded by a single resistance welding because the resistance welding current flows from the collector member or the welding receiving member.

Moreover, because the current carrying block includes the protrusion, current is concentrated at the protrusion to readily generate heat during resistance welding. Therefore, the portions to be resistance-welded between the collector members or the welding receiving members and the substrate exposed portions, and between the substrate exposed portions and the current carrying block (two welds each) can be readily resistance-welded in each of the electrode sheets. In the invention, when the welding receiving member is placed on each of the outermost surfaces of the two-divided substrate exposed portions in each of the electrode sheets, the current carrying block may be used as the collector member and electrically connected to the external terminal using a connection member and the like. Therefore, a sealed battery having small internal resistance can be manufactured by the method for manufacturing a sealed battery of the invention, because the electric resistance between the substrate exposed portions and the collector member is reduced in each of the electrode sheets.

In addition, in the method for manufacturing a sealed battery of the invention, the number of stacked positive electrode substrate exposed portions or negative electrode substrate exposed portions that must be welded at a resistance-welding site is reduced by half, and thus the substrate exposed portions can be resistance-welded with smaller electric power because the plurality of positive or negative electrode substrate exposed portions are stacked and divided into two. The placing of a collector member or a welding receiving member on each of the outermost surfaces of the two-divided substrate exposed portions and the placing of a current carrying block including a first protrusion on one face of a metal block and a second protrusion on another face, the faces opposing each other, between the two-divided substrate exposed portions to bring each of the protrusions on the two opposing faces into contact with each of the two-divided substrate exposed portions may be performed in any order. Furthermore, each of the items (2) to (5) may apply to both of the positive electrode and the negative electrode, or to one of the electrodes.

Furthermore, in the method for manufacturing a sealed battery of the invention, it is preferable that a corner between each of the two opposing faces and a side face of the metal block be chamfered in the current carrying block.

By the method for manufacturing a sealed battery of the invention, when the current carrying block is inserted between the stacked substrate exposed portions, the block causes less damage to the stacked substrate exposed portions and can be readily inserted at the welding position of the stacked substrate exposed portions, and therefore the weldability can be improved.

Furthermore, in the method for manufacturing a sealed battery of the invention, it is preferable that the chamfered portion in the metal block have a flat surface in the current carrying block.

By the method for manufacturing a sealed battery of the invention, the stacked substrate exposed portions readily comes in contact with the protrusion to improve the weldability when the current carrying block is inserted between the stacked substrate exposed portions because the portion between the chamfered face of the corner and the face having the protrusion always has an obtuse angle with respect to the stacked substrate exposed portions.

Furthermore, in the method for manufacturing a sealed battery of the invention, it is preferable that the two faces having the protrusions of the metal block have flat portions that are parallel to each other in the current carrying block.

By the method for manufacturing a sealed battery of the invention, the current carrying block is less deformed by the pressure from the electrodes for resistance welding during resistance welding, furthermore, a part of the protrusion that is melted and deformed during resistance welding, or a part of the melted substrate stays on the flat portion to prevent the melt from flowing to the side face of the current carrying block, and moreover, the flat portion comes in contact with the member to be welded to stabilize the current carrying block. Therefore, a resistance-welded portion with high reliability can be obtained.

Furthermore, in the method for manufacturing a sealed battery of the invention, it is preferable that the protrusions each have a truncated cone or pyramid shape in the current carrying block.

By the method for manufacturing a sealed battery of the invention, heat is more readily generated, the weldability becomes more stable, and, moreover, a sealed battery having better quality of the welded portion can be manufactured because current is concentrated during resistance welding at the tip of the protrusion having the truncated cone shape or the truncated pyramid shape.

Furthermore, in the method for manufacturing a sealed battery of the invention, it is preferable that the protrusions each have a portion defining an opening in the current carrying block.

When the protrusion has a portion defining an opening, current is likely to be concentrated at the protrusion according to the opening to readily intensively generate the heat at the protrusion. Thus, by the method for manufacturing a sealed battery of the invention, a sealed battery having smaller internal resistance as well as having good quality of the welded portion can be manufactured.

Furthermore, in the method for manufacturing a sealed battery of the invention, it is preferable that the opening be extended to reach inside the metal block in the current carrying block.

If the opening is extended to reach inside the metal block, a cavity more certainly exists inside the protrusion or the metal block even when the electrode rods for resistance welding strongly sandwich the protrusion during welding to collapse the tip, or even when the tip of the protrusion is melted during resistance welding. Accordingly, the heat generated in the protrusion is prevented from diffusing and thus the protrusion and the surrounding area can locally reach high temperature. Furthermore, the cavity existing inside the metal block near the protrusion can efficiently prevent the heat generated in the protrusion from diffusing throughout the metal block. Therefore, by the method for manufacturing a sealed battery of the invention, a sealed battery having smaller internal resistance as well as having good quality of the welded portion can be manufactured.

Furthermore, in the method for manufacturing a sealed battery of the invention, the opening may penetrate the metal block in the current carrying block.

When the opening penetrates the metal block, the metal block has a cylinder shape making it lightweight. Moreover, the metal block having a cylinder shape has high strength with respect to the force applied along the central axis direction of the opening and is less deformed. Therefore, by the method for manufacturing a sealed battery of the invention, a sealed battery that has lightweight as well as readily providing the above effects can be manufactured.

Furthermore, in the method for manufacturing a sealed battery of the invention, it is preferable that an insulating seal material be annularly formed around the protrusion in the current carrying block.

In the case where the insulating seal material is annularly formed around the protrusion of the current carrying block for resistance welding, particles with high temperature can be captured between the insulating seal material and the protrusion, or by the insulating seal material itself even when high-temperature spattered particles are generated during resistance welding. Therefore, by the method for manufacturing a sealed battery of the invention, it is rare for an internal short circuit of the battery that is caused by the high-temperature spattered particles to occur because the high-temperature spattered particles generated during resistance welding are less dispersed around the current carrying block.

Here, the insulating seal material is preferably made of an insulating thermally depositing resin in order to improve the characteristics for capturing the high-temperature spattered particles. When the insulating thermally depositing resin is used as the insulating seal material, the spattered particles are readily captured in the solid insulating thermally depositing resin because the high-temperature spattered particles generated during resistance welding partially melt the solid insulating thermally depositing resin to lose the heat and are rapidly cooled to reduce the temperature. Here, it is rare that the entire insulating thermally depositing resin is melted all at once because the time for applying the current is short and the area where the current is applied is small during resistance welding. Therefore, a sealed battery that rarely causes an internal short circuit and has high reliability can be obtained because the spattered particles generated during resistance welding are less dispersed from the insulating thermally depositing resin, resulting in less of the particles entering into the flat electrode assembly. Here, the insulating thermally depositing resin desirably has a deposition temperature of about 70 to 150° C. and a melting temperature of 200° C. or more, and moreover has chemical resistance with respect to electrolyte and the like.

Furthermore, in the method for manufacturing a sealed battery of the invention, it is preferable that the insulating seal material have a height smaller than that of the protrusions.

The protrusion of the current carrying block jams into the stacked substrate exposed portions because the stacked substrate exposed portions are pressed toward the current carrying block by the electrode for resistance welding during resistance welding. By the method for manufacturing a sealed battery of the invention, the insulating seal material comes in contact with the stacked substrate exposed portions during resistance welding because the insulating seal material has a height smaller than that of the protrusion, and thus the high-temperature spattered particles are less dispersed resulting in less of the particles entering into the flat electrode assembly. In addition, excess deformation of the stacked substrate exposed portions except for the portion to be resistance-welded is less generated and a sealed battery that rarely causes the internal short circuit and that has high reliability can be obtained.

Furthermore, in the method for manufacturing a sealed battery of the invention, it is preferable that the protrusions corresponding to the positive electrode substrate exposed portions and the negative electrode substrate exposed portions have different shapes in the current carrying block.

In a common sealed battery, the positive electrode substrate employs a different metal material from that of the negative electrode substrate, for example, in a lithium ion secondary battery, the positive electrode substrate employs aluminum or an aluminum alloy, and the negative electrode substrate employs copper or a copper alloy. As the copper or copper alloy has smaller electric resistance as compared with that of the aluminum or aluminum alloy, the resistance welding of the negative electrode substrate exposed portion is more difficult than the resistance welding of the positive electrode substrate exposed portion, and thus the stacked negative electrode substrate exposed portions sometimes have a portion that resists melting.

In the method for manufacturing a sealed battery of the invention, the protrusion of the current carrying block used for the positive electrode substrate exposed portions has a different shape from that of the protrusion of the current carrying block used for the negative electrode substrate exposed portions, and thus the current carrying blocks each having a shape suitable for the positive electrode substrate exposed portion or the negative electrode substrate exposed portion may be selected to be used. For example, in the case where aluminum or an aluminum alloy is used as the material for the positive electrode substrate and copper or an copper alloy is used as the material for the negative electrode substrate, the negative electrode substrate exposed portions preferably employ the current carrying block in which the protrusion has a portion defining an opening in order to concentrate welding current to readily perform resistance welding, and furthermore, the positive electrode substrate exposed portions preferably employ the current carrying block in which the opening is not formed in the protrusion so that the current carrying block is less deformed because the resistance welding readily progresses.

Furthermore, in the method for manufacturing a sealed battery of the invention, it is preferable that the opening be half-collapsed by the pressure applied in the resistance welding with pressure applied between the pair of electrodes for resistance welding.

When the opening formed in the protrusion is half-collapsed, because the opening in the protrusion is collapsed to form a cavity inside the protrusion as well as the collapsed part is centered in the protrusion, the current during resistance welding is once dispersed around the opening in the protrusion and then concentrated at the central part of the protrusion. Therefore, by the method for manufacturing a sealed battery of the invention, as compared with the current carrying block in which the opening formed in the protrusion is not half-collapsed, the heat can be sufficiently generated not only around the protrusion but also at the central part of the protrusion, and thus a sealed battery that well provides the above effect can be manufactured. Here, it is not preferable that the opening formed in the protrusion be completely collapsed by the pressure during welding, that is, that no cavity be formed in the protrusion or the current carrying block, because the effect by the formed opening is reduced.

According to still another aspect of the invention, a sealed battery is manufactured by any of the aforementioned methods for manufacturing a sealed battery.

With the sealed battery of the invention, as compared with a conventional sealed battery, the resistance-welded portion between the positive electrode substrate exposed portion or the negative electrode substrate exposed portion, and the positive electrode collector member or the negative electrode collector member has lower electric resistance, and therefore the sealed battery has lower internal resistance.

BRIEF DESCRIPTION OF THE DRAWINGS

The invention will be described with reference to the accompanying drawings, wherein like numbers reference like elements.

FIG. 5A is a view showing pathways where resistance welding current flows when the portion where the protrusion is in contact with the positive electrode substrate exposed portion has an annular shape, FIG. 5B is a view showing a portion where heat is largely generated in FIG. 5A, FIG. 5C is a view showing a pathway where the resistance welding current flows when the portion where the protrusion is in contact with the positive electrode substrate exposed portion has a disk shape, and FIG. 5D is a view showing a portion where heat is largely generated in FIG. 5C.

FIG. 7A is an elevation view showing a current carrying block of a fourth embodiment of the present invention, FIG. 7B is a cross-sectional view of FIG. 7A, and FIG. 7C is a plan view showing an annular insulating seal material.

FIG. 8A is a cross-sectional view showing an electric double layer capacitor as the conventional storage element, FIG. 8B is a cross-sectional view taken along the line VIIIB-VIIIB of FIG. 8A, and FIG. 8C is a cross-sectional view taken along the line VIIIC-VIIIC of FIG. 8A.

DESCRIPTION OF EXEMPLARY EMBODIMENTS

Hereinafter, exemplary embodiments of the invention will be described in detail. However, the embodiments below are intended to exemplify the technical spirit of the invention, are not intended to limit the invention to these embodiments, and the invention may be equally applied to various modified cases without departing from the technical spirit described in the claims. The electric power-generating element capable of being used in the invention is a flat electric power-generating element in which a positive electrode sheet and a negative electrode sheet are wound or stacked with a separator interposed therebetween to form a plurality of positive electrode substrate exposed portions at one end and a plurality of negative electrode substrate exposed portions at the other end. Hereinafter, the wound electrode assembly will be described as a representative.

First Embodiment

Figure 1A:
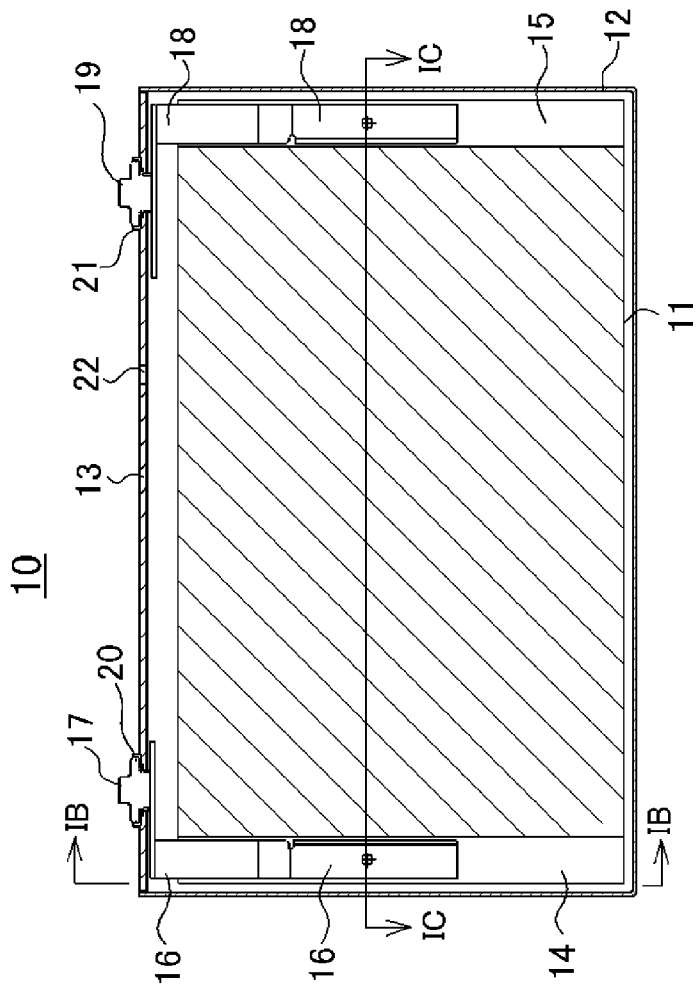
FIG. 1A is a cross-sectional view showing a nonaqueous electrolyte secondary battery of a first embodiment of the present invention.
Figure 1B:
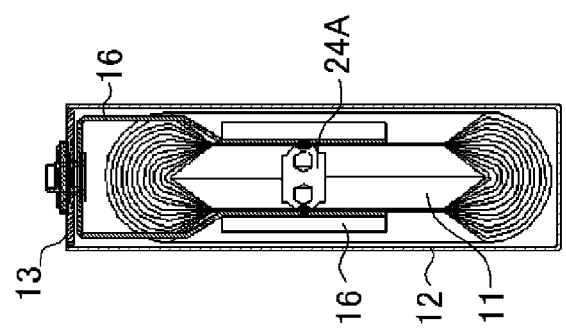
FIG. 1B is a cross-sectional view taken along the line IB-IB of FIG. 1A.
Figure 1C:
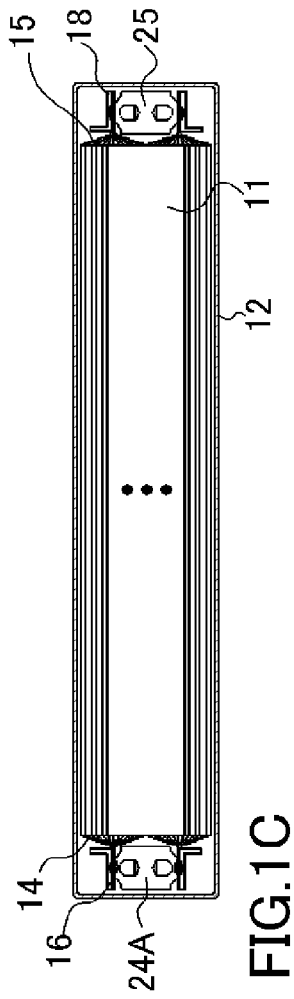
FIG. 1C is a cross-sectional view taken along the line IC-IC of FIG. 1A.

First, as an example of the sealed battery of a first embodiment of the present invention, a prismatic nonaqueous electrolyte secondary battery will be described with reference to FIGS. 1A to 1C. FIG. 1A is a cross-sectional view showing the nonaqueous electrolyte secondary battery of the first embodiment, FIG. 1B is a cross-sectional view taken along the line IB-IB of FIG. 1A, and FIG. 1C is a cross-sectional view taken along the line IC-IC of FIG. 1A. The nonaqueous electrolyte secondary battery 10 includes a flat wound electrode assembly 11 in which positive and negative electrode sheets (not shown) are wound with a separator interposed therebetween (not shown).

The positive electrode sheet is prepared by applying a positive electrode active material mixture on both sides of a positive electrode substrate made of aluminum foil so as to form a positive electrode substrate exposed portion 14 where strip-shaped aluminum foil is exposed, drying the resulting substrate, and then rolling it with pressure applied thereto. The negative electrode sheet is prepared by applying a negative electrode active material mixture on both sides of a negative electrode substrate made of copper foil so as to form a negative electrode substrate exposed portion 15 where strip-shaped copper foil is exposed, drying the resulting substrate, and then rolling it with pressure applied thereto. Then, the flat wound electrode assembly 11 is prepared by which the positive and negative electrode sheets are flatly wound with a polyethylene porous separator, for example, interposed therebetween, so that the plurality of positive electrode substrate exposed portions 14 are exposed at one end in the winding axis direction and the plurality of negative electrode substrate exposed portions 15 are exposed at the other end in the winding axis direction.

The plurality of positive electrode substrate exposed portions 14 are stacked and connected to a positive electrode terminal 17 through a positive electrode collector member 16, and similarly the plurality of negative electrode substrate exposed portions 15 are stacked and connected to a negative electrode terminal 19 through a negative electrode collector member 18. The positive electrode terminal 17 and the negative electrode terminal 19 are fixed to a sealing plate 13 through insulating members 20 and 21, respectively. The prismatic nonaqueous electrolyte secondary battery 10 of the embodiment is manufactured by inserting the flat wound electrode assembly 11 prepared as described above into a prismatic battery outer can 12, laser-welding the sealing plate 13 to a mouth portion of the battery outer can 12, then pouring a nonaqueous electrolyte through an electrolyte pour hole 22, and sealing up the electrolyte pour hole 22.

In the flat wound electrode assembly 11, the plurality of stacked positive electrode substrate exposed portions 14 are divided into two and a current carrying block for the positive electrode 24A is interposed therebetween in the positive electrode sheet side, and similarly the plurality of stacked negative electrode substrate exposed portions 15 are divided into two and a current carrying block for the negative electrode 25 is interposed therebetween in the negative electrode sheet side. Furthermore, each of the positive electrode collector members 16 is placed on each of the outermost surfaces of the positive electrode substrate exposed portions 14 that interpose the current carrying block for the positive electrode 24A, and each of the negative electrode collector members 18 is placed on each of the outermost surfaces of the negative electrode substrate exposed portions 15 that interpose the current carrying block for the negative electrode 25. Here, the current carrying block for the positive electrode 24A is made of aluminum that is the same material as that for the positive electrode substrate, and the current carrying block for the negative electrode 25 is made of copper that is the same material as that for the negative electrode substrate, but the current carrying block for the positive electrode 24A can have substantially the same shape as that of the current carrying block for the negative electrode 25.

The positive electrode collector members 16 and the positive electrode substrate exposed portions 14, as well as the positive electrode substrate exposed portions 14 and the current carrying block for the positive electrode 24A are both resistance-welded (two welds each), and furthermore, the negative electrode collector members 18 and the negative electrode substrate exposed portions 15, as well as the negative electrode substrate exposed portions 15 and the current carrying block for the negative electrode 25 are both resistance-welded (two welds each) to be connected.

Hereinafter, the shapes of the current carrying block for the positive electrode 24A and the current carrying block for the negative electrode 25, the resistance welding method of the positive electrode substrate exposed portions 14, the positive electrode collector members 16, and the current carrying block for the positive electrode 24A, and the resistance welding method of the negative electrode substrate exposed portions 15, the negative electrode collector members 18, and the current carrying block for the negative electrode 25 will be described in detail with reference to FIGS. 2A to 5D. However, in the first embodiment, the positive electrode sheet side will be described below as a representative because the current carrying block for the positive electrode 24A has substantially the same shape as that of the current carrying block for the negative electrode 25, and moreover, because the resistance welding method of the positive electrode substrate exposed portions 14, the positive electrode collector members 16, and the current carrying block for the positive electrode 24A on the positive electrode sheet side is the same as the resistance welding method of the negative electrode substrate exposed portions 15, the negative electrode collector members 18, and the current carrying block for the negative electrode 25 on the negative electrode side.

Figure 2C:
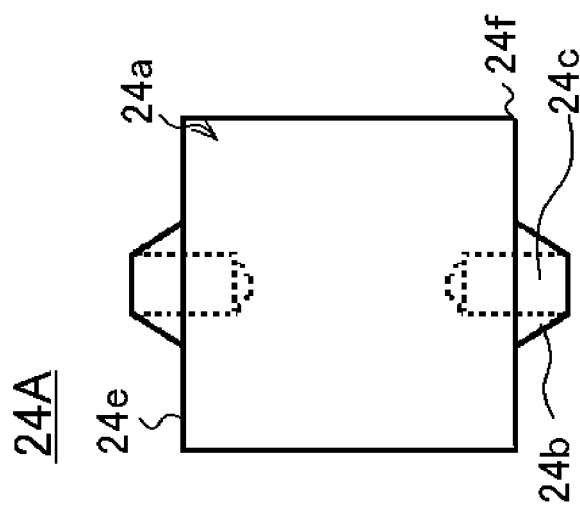
FIG. 2C is an elevation view.
Figure 2B:
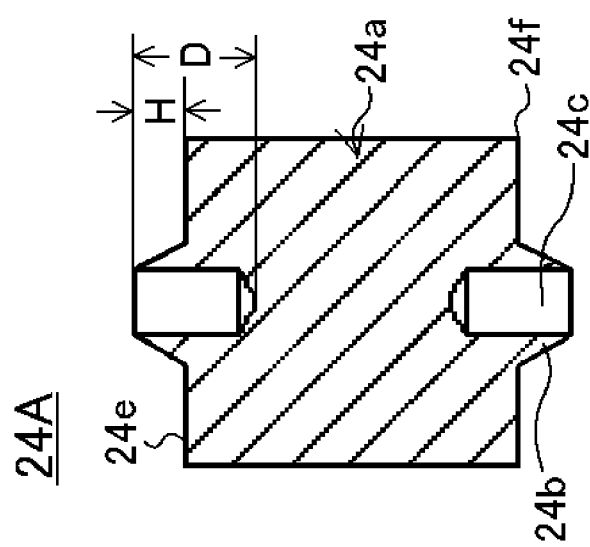
FIG. 2B is a cross-sectional view taken along the line IIB-IIB of FIG. 2A.
Figure 2A:
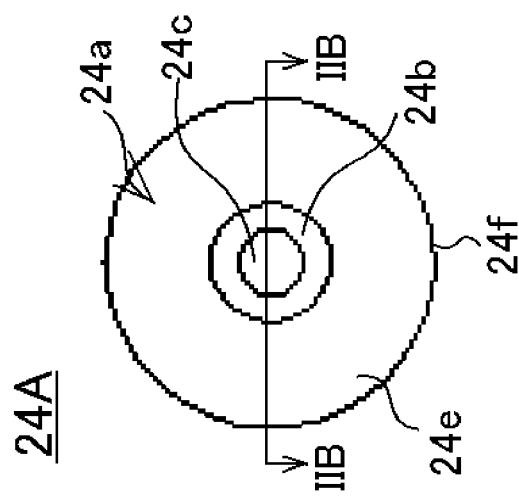
FIG. 2A is a plan view showing a current carrying block for the positive electrode of the first embodiment.

The current carrying block for the positive electrode 24A of the first embodiment will be described with reference to FIGS. 2A to 2C. FIG. 2A is a plan view showing the current carrying block for the positive electrode 24A, FIG. 2B is a cross-sectional view taken along the line IIB-IIB of FIG. 2A, and FIG. 2C is an elevation view. In the current carrying block for the positive electrode 24A, a protrusion 24b having, for example, a truncated cone shape is formed on each of the two opposing faces 24e of a column-shaped main body 24a. In addition, an opening 24c is formed from the tip at the central part of the truncated-cone-shaped protrusion 24b to the inside of the column-shaped main body 24a, and the column-shaped main body 24a has a corner 24f between each of the two opposing faces 24e and the side face.

The truncated-cone-shaped protrusion 24b may have substantially the same height H as that of a protrusion (projection) generally formed on a resistance-welding member, that is, a height of several millimeters. The depth D of the opening 24c is set to be larger than the height H of the protrusion 24b. The opening 24c is preferably formed to be shallower than the depth of the height H of the protrusion 24b from the face 24e, having the protrusion 24b, of the column-shaped main body 24a (the depth D of the opening 24c is preferably smaller than 2H), and more preferably formed to be shallower than half of the height H of the protrusion 24b from the surface, having the protrusion 24b, of the column-shaped main body 24a (the depth D of the opening 24c is more preferably smaller than ³⁄₂H). The opening 24c having an excessively large depth is not preferable because the electrical conductivity of the column-shaped main body 24a may be reduced when the column-shaped main body 24a has a small diameter.

Furthermore, the diameter and length of the column-shaped main body 24a vary depending on the flat wound electrode assembly 11 or the battery outer can 12 (see FIGS. 1A to 1C) but may be about 3 mm to several 10 mm. Here, in the current carrying block for the positive electrode 24A, the main body 24a having a column shape has been described but a metal block having any shape such as a prismatic shape and elliptical column shape may optionally be used. Furthermore, the current carrying block for the positive electrode 24A may be made of a material such as copper, a copper alloy, aluminum, an aluminum alloy, tungsten, and molybdenum. Furthermore, among the current carrying block for the positive electrode 24A made of such metal, modified current carrying blocks, such as a current carrying block in which the protrusion 24b is coated with nickel and a current carrying block in which the material of the protrusion 24b and the vicinity of the bottom is changed to a metal material that accelerates heat generation, such as tungsten and molybdenum, and then the protrusion 24b is joined by brazing and the like with the main body 24a, which is made of copper, a copper alloy, aluminum or an aluminum alloy, of the current carrying block for the positive electrode 24A, may also be used.

Figure 3:
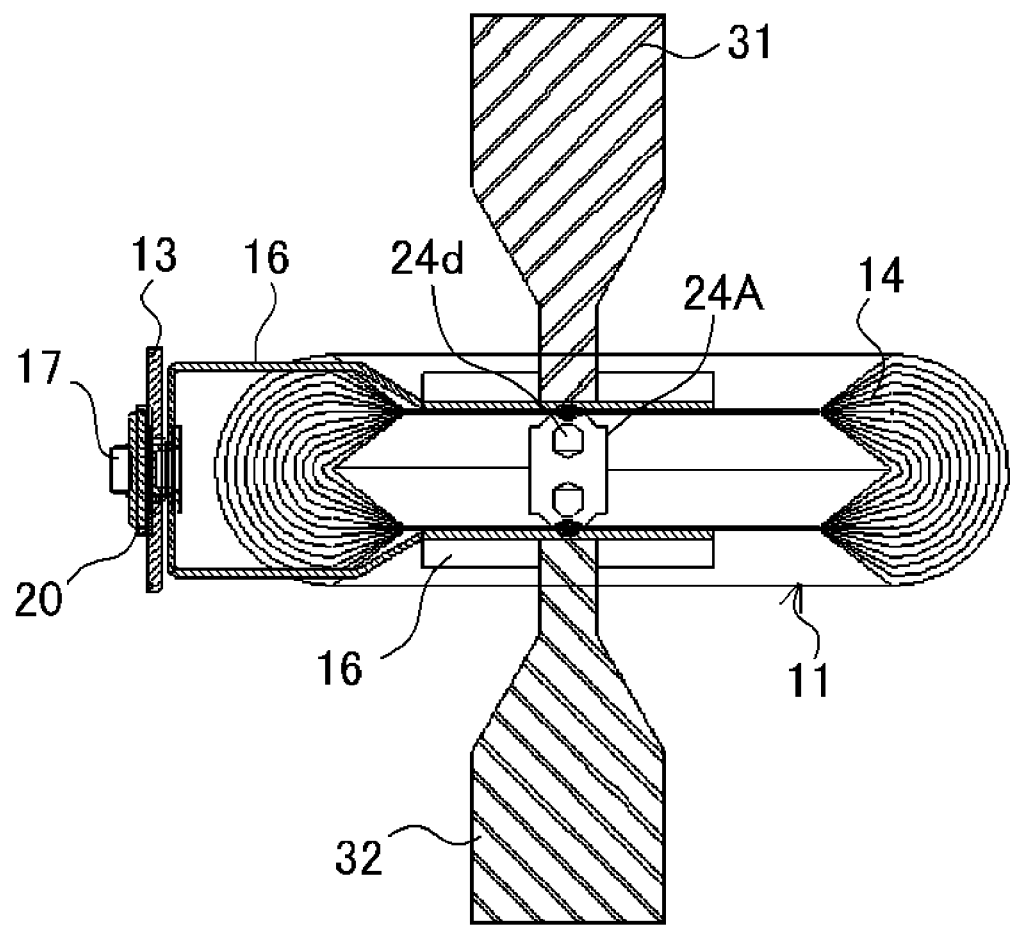
FIG. 3 is a side view showing the welding state of the first embodiment.

Next, a specific method for producing the sealed battery of the first embodiment will be described. As shown in FIG. 3, the aluminum foil positive electrode substrate exposed portions 14 of the flat wound electrode assembly 11 are stacked, and the stacked positive electrode substrate exposed portions 14 are divided into two from the central part of the winding to gather the positive electrode substrate exposed portions 14 with their center on positions of ¼H from the central part of the winding (where H is the thickness of the electrode assembly). Then, each of the positive electrode collector members 16 is placed on each of the outermost faces of the positive electrode substrate exposed portions 14 and the current carrying block for the positive electrode 24A is placed on both of the inner faces so that each of the truncated-cone-shaped protrusions 24b on both sides of the current carrying block for the positive electrode 24A is brought into contact with the positive electrode substrate exposed portions 14. Here, each of the gathered aluminum foils has a thickness of about 660 µm, and the total number of stacked foils is 88 pieces (44 pieces for each side). Furthermore, the positive electrode collector member 16 is prepared from an aluminum plate having a thickness of 0.8 mm by punching, bending, or the like. Here, the positive electrode collector member 16 may be prepared from an aluminum plate by casting or the like.

Then, as shown in FIG. 3, the flat wound electrode assembly 11 in which the positive electrode collector members 16 and the current carrying block for the positive electrode 24A are placed between a pair of electrode rods 31 and 32 for resistance welding that are placed above and below, the pair of electrode rods 31 and 32 for resistance welding each are brought into contact with the positive electrode collector members 16 that are placed on each of the outermost sides of the positive electrode substrate exposed portions 14. Then, a suitable pressure is applied between the pair of electrode rods 31 and 32 for resistance welding and the resistance welding is performed under a predetermined condition.

Because the opening 24c is formed in the protrusion 24b, current is readily concentrated at the tip of the protrusion, furthermore, the tip of the protrusion readily jams into the substrate exposed portions, and thus the weldability is more improved than the case where the opening 24c is not formed. Then, when resistance welding is performed with pressure so that the tip of the protrusion 24b is half-collapsed and the portion where the protrusion 24b is in contact with the positive electrode substrate exposed portion 14 is changed from an annular shape to a disk shape, the welding becomes more stable.

Figure 4:
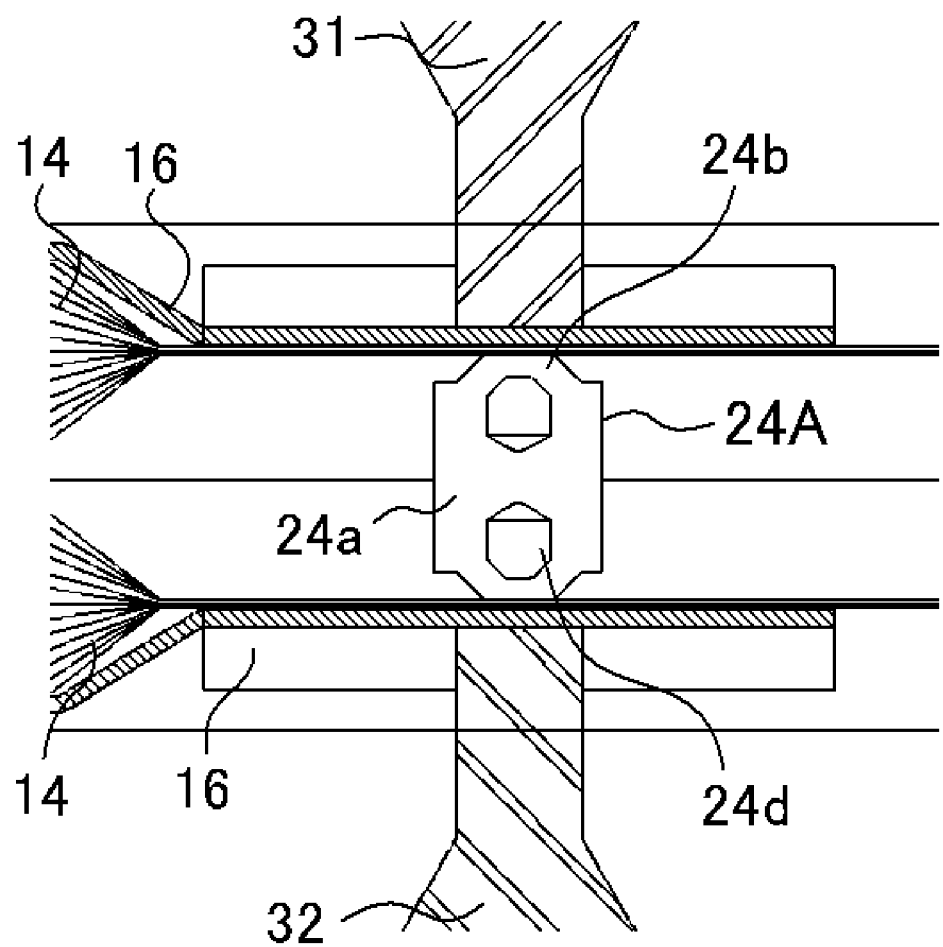
FIG. 4 is an enlarged view of the welded portion in FIG. 3.

Accordingly, as for the shape of the protrusion 24b of the current carrying block for the positive electrode 24A, as shown in FIG. 4, it is desirable that the tip of the protrusion 24b become half-collapsed and the portion where the protrusion 24b is in contact with the positive electrode substrate exposed portion 14 be changed from the annular shape to the disk shape. FIG. 4 is an enlarged view of the welded portion in FIG. 3. In this case, a cavity 24d has to be formed inside the protrusion 24b. When the portion where the protrusion 24b is in contact with the positive electrode substrate exposed portion 14 has a disk shape, heat generation from the center of the current carrying block for the positive electrode 24A is accelerated, and thus the welding becomes more stable.

It is known that whether the portion where the protrusion 24b is in contact with the positive electrode substrate exposed portion 14 becomes half-collapsed or annular depends on the applied pressure during welding. When the welding pressure is small, the tip of the protrusion tends to become annular, and in contrast, when the welding pressure is large, the tip of the protrusion tends to become half-collapsed. In addition, it is supposed that the protrusion 24b having a larger height and the opening 24c having a larger depth are likely to cause the opening often to be half-collapsed, and when the opening has a small depth, the tip of the protrusion 24c often jams into the substrate exposed portion with the annular tip remaining intact.

Furthermore, during the resistance welding, the pair of electrode rods 31 and 32 for resistance welding desirably have the same central axis as that of the current carrying block for the positive electrode 24A, and the current carrying block for the positive electrode 24A is desirably held by pressure and the like so as not to be displaced. Furthermore, a known welder using a semiconductor-controlled welding power source employing a transistor and the like may be used for the resistance welder.

Here, the reason why the heat generation when the portion where the protrusion 24b is in contact with the positive electrode substrate exposed portion 14 has an annular shape is different from that when the portion has a disk shape will be described with reference to FIGS. 5A to 5D. FIG. 5A is a view showing pathways where resistance welding current flows when the portion where the protrusion 24b is in contact with the positive electrode substrate exposed portion 14 has an annular shape, FIG. 5B is a view showing a portion where heat is largely generated in FIG. 5A, FIG. 5C is a view showing a pathway where resistance welding current flows when the portion where the protrusion 24b is in contact with the positive electrode substrate exposed portion 14 has a disk shape, and FIG. 5D is a view showing a portion where heat is largely generated in FIG. 5C.

Due to current flowing through a pathway having the least resistance value, the current most readily flows in the center in the electrode rods 31 and 32 for resistance welding. When the portion where the protrusion 24b is in contact with the positive electrode substrate exposed portion 14 has an annular shape, as shown FIG. 5A, the welding current I flows, for example, from the upper electrode rod for resistance welding 31 through the upper positive electrode collector member 16 and the positive electrode substrate exposed portion 14, then, is annularly divided from the annular tip of the upper protrusion 24b on the current carrying block for the positive electrode 24A to flow in the main body 24a of the current carrying block for the positive electrode 24A, furthermore, flows through the annular tip of the lower protrusion 24b on the current carrying block for the positive electrode 24A to be concentrated, and then, flows through the lower positive electrode substrate exposed portion 14 and the positive electrode collector member 16 to the lower electrode rod for resistance welding 32.

Consequently, when the portion where the protrusion 24b is in contact with the positive electrode substrate exposed portion 14 has an annular shape, because the current does not flow at the center of the protrusion 24b, as shown in FIG. 5B, the starting point of the welding is annularly generated, and thus a large number of starting points are generated.

In contrast, when the portion where the protrusion 24b is in contact with the positive electrode substrate exposed portion 14 is half-collapsed to have a disk shape, because the cavity 24d is formed inside the protrusion 24, as shown in FIG. 5C, the welding current I flows, for example, from the upper electrode rod for resistance welding 31 through the upper positive electrode collector member 16 and the positive electrode substrate exposed portion 14, then, is annularly divided from the center of the disk-shaped tip of the upper protrusion 24b on the current carrying block for the positive electrode 24A to flow in the main body 24a of the current carrying block for the positive electrode 24A, furthermore, flows through the center of the disk-shaped tip of the lower protrusion 24b on the current carrying block for the positive electrode 24A to be concentrated, and then, flows through the lower positive electrode substrate exposed portion 14 and the positive electrode collector member 16 to the lower electrode rod for resistance welding 32.

In this example, though the welding current I is annularly divided at the protrusion 24b avoiding the cavity 24d, because the cavity 24d is present at the interior of the disk-shaped tip, the metal is less melted to reduce the heat absorption, and thus the heat is most readily generated near the center of the disk-shaped tip of the protrusion 24b. Accordingly, when the portion where the protrusion 24b is in contact with the positive electrode substrate exposed portion 14 has a disk shape, the shape of the portion where the large heat is generated by the welding current I becomes spherical as shown in FIG. 5D because the current is concentrated at the center of the disk-shaped tip of the protrusion 24b, the welding becomes more stable as well as strong.

The first embodiment has exemplified the current carrying block for the positive electrode 24A that has the column-shaped main body 24a and the truncated-cone-shaped protrusion 24b including the opening 24c. However, in the invention, any protrusion 24b without the opening and any protrusion 24b having a truncated pyramid shape such as a truncated triangular pyramid, truncated square pyramid, and truncated polygonal pyramid shape may be used.

When the opening is not formed in the protrusion 24b, the protrusion 24b has the same action as that of a conventional projection during resistance welding. Even in this case, the resistance welding can be well performed between the positive electrode collector members 16, the plurality of stacked positive electrode substrate exposed portions 14, and the current carrying block for the positive electrode 24A. Under stable conditions where current, current carrying time, and applied pressure do not vary, a welding state of the resistance-welded portion widely varies depending on the presence of a protrusion. For example, when a current carrying block for the positive electrode without a protrusion is used in stable conditions where welding can be performed with a protrusion (the condition where a weld is broken at about 10 kgf in the destructive test of the weld), welding is not performed at all and the current carrying block for the positive electrode comes off.

The current carrying block for the positive electrode 24A that has a column-shaped main body 24a has been exemplified. However, the main body 24a of the current carrying block for the positive electrode 24A may be a metal block having any block shape such as a prismatic shape or elliptical column shape, and furthermore, a block with the opening 24c (see FIGS. 2A to 2C) that penetrates the main body 24a may be used. In particular, when the opening 24c (see FIGS. 2A to 2C) penetrates the main body 24a, the main body 24a of the current carrying block for the positive electrode 24A has a cylinder shape. In this case, both ends of the main body 24a may be shaped into protrusions or may be used as protrusions without any processing.

The first embodiment has exemplified that the plurality of stacked positive electrode substrate exposed portions 14 are divided into two and resistance-welded using the positive electrode collector members 16 and the current carrying block for the positive electrode 24A. However, the current carrying block for the positive electrode 24A may also be used as the positive electrode collector member and connected with the positive electrode terminal 17. In this case, in place of the positive electrode collector member used in the first embodiment, a welding receiving member prepared from a thin plate made of the same material as that of the current carrying block for the positive electrode 24A may be used.

Second Embodiment

The first embodiment has exemplified, as shown in FIGS. 2A to 2C, the current carrying block for the positive electrode 24A in which, for example, the truncated-cone-shaped protrusion 24b is formed on each of the two opposing faces 24e of the column-shaped main body 24a. In this manner, when the main body 24a has a column shape, the column-shaped main body 24a has a corner 24f between each of the two opposing faces 24e and the side face. Consequently, as shown in FIG. 3, when the current carrying block for the positive electrode 24A is placed inside the two-divided stacked positive electrode substrate exposed portions 14 so as to bring each of the truncated-cone-shaped protrusions 24b on the current carrying block for the positive electrode 24A into contact with the stacked positive electrode substrate exposed portions 14, the corner 24f readily comes in contact with the stacked positive electrode substrate exposed portion 14, and thus the positive electrode substrate exposed portion 14 is readily deformed.

Figure 6C:
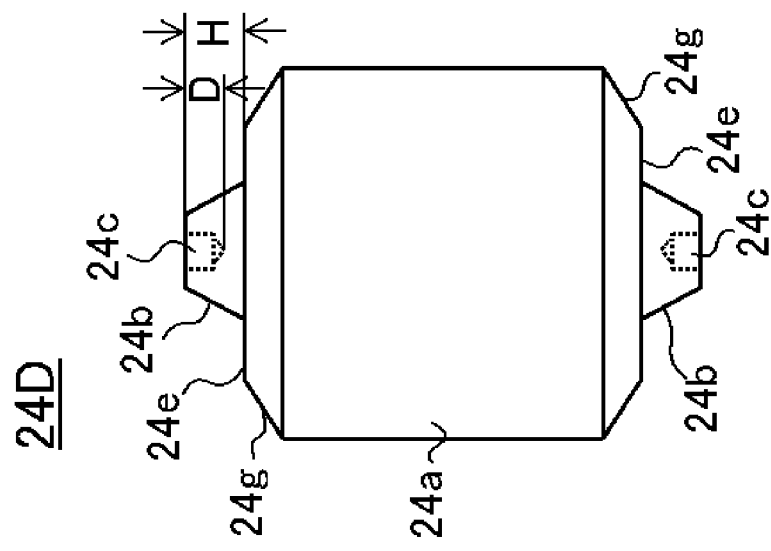
FIG. 6C is an elevation view showing a current carrying block of a third embodiment of the present invention.

Therefore, in a current carrying block for the positive electrode 24B of a second embodiment of the present invention, a chamfered face 24g is formed at the corner 24f between each of the two opposing faces 24e and the side face of the column-shaped main body 24a in the first embodiment. The current carrying block for the positive electrode 24B of the second embodiment will be described with reference to FIG. 6A. FIG. 6A is an elevation view showing the current carrying block for the positive electrode 24B of the second embodiment.

With the current carrying block for the positive electrode 24B in which the chamfered face 24g is formed in this manner in the second embodiment, when the current carrying block for the positive electrode 24B is placed inside the two-divided stacked positive electrode substrate exposed portions 14 so as to bring each of the truncated-cone-shaped protrusions 24b of the current carrying block for the positive electrode 24B into contact with the positive electrode substrate exposed portions 14, the block causes less damage to the stacked positive electrode substrate exposed portions 14 and can be readily inserted to the welding position of the stacked positive electrode substrate exposed portions 14, and therefore weldability can be improved.

Here, the chamfered face 24g of the current carrying block for the positive electrode 24B in the second embodiment could have a curved or flat surface. However, when the chamfered face 24g has a flat surface, the portion between the chamfered face 24g and the face having the protrusion 24b always has an obtuse angle with respect to the stacked positive electrode substrate exposed portions 14. Therefore, when the current carrying block for the positive electrode 24B is brought into contact with the stacked positive electrode substrate exposed portions 14, the positive electrode substrate exposed portions 14 readily come in contact with the protrusions 24b to further improve the weldability.

Figure 6B:
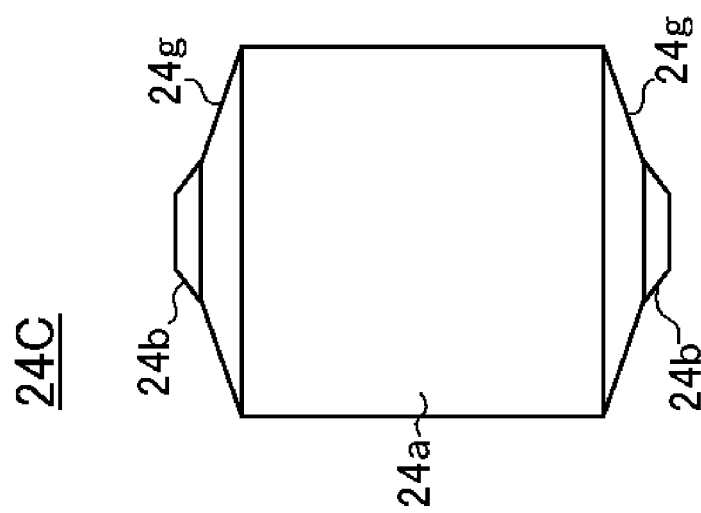
FIG. 6B is an elevation view showing a modified current carrying block of the second embodiment.
Figure 6A:
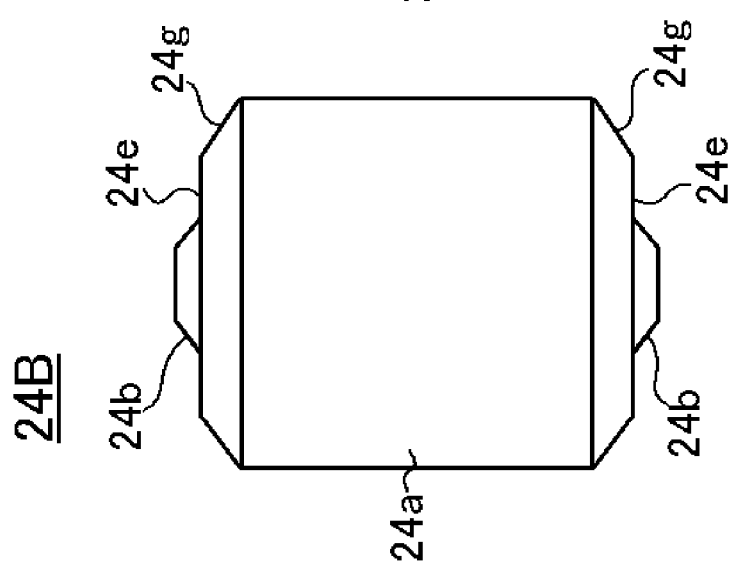
FIG. 6A is an elevation view showing a current carrying block of a second embodiment of the present invention.
Figure 9:
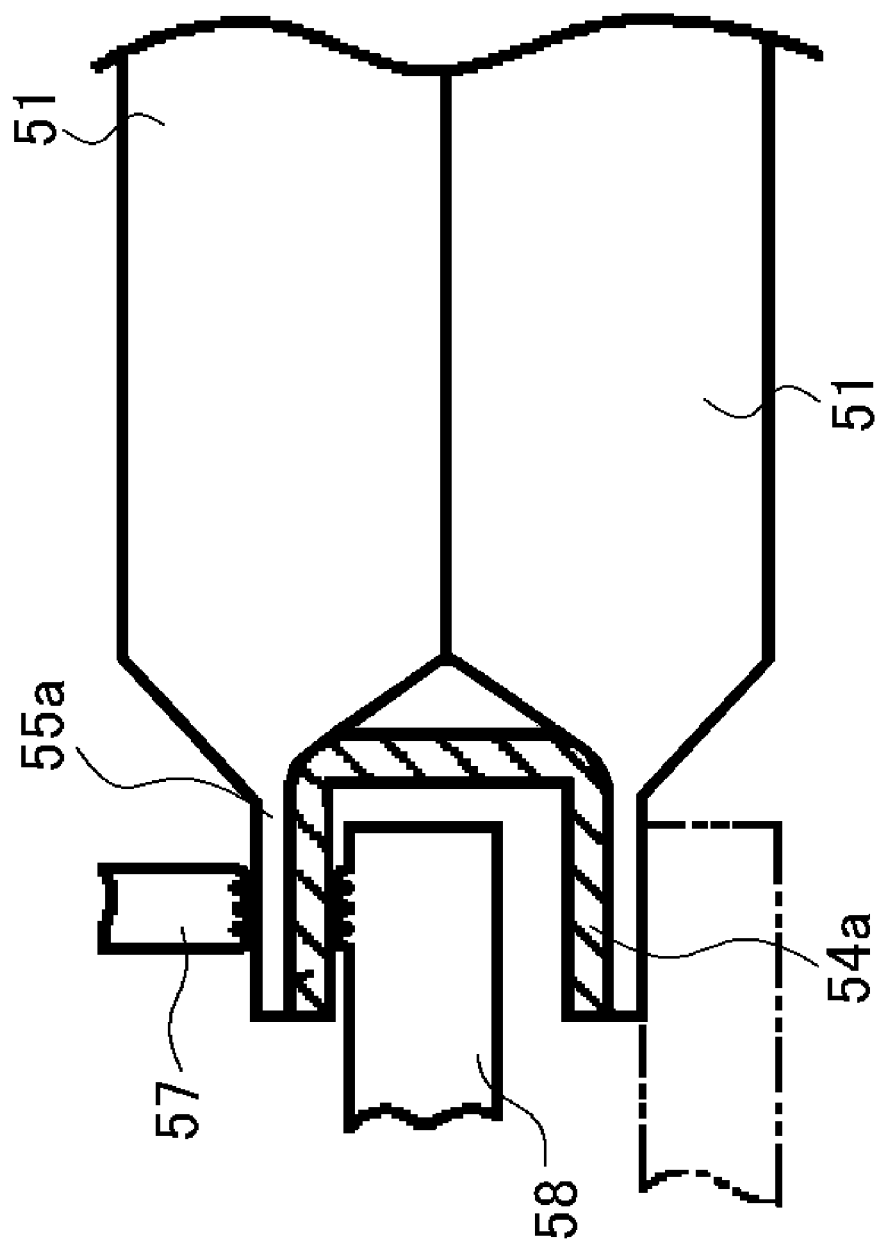
FIG. 9 is a view showing the welding process between the substrate exposed portion of the electrode and the collector member in FIGS. 8A to 8C.
Figure 10:
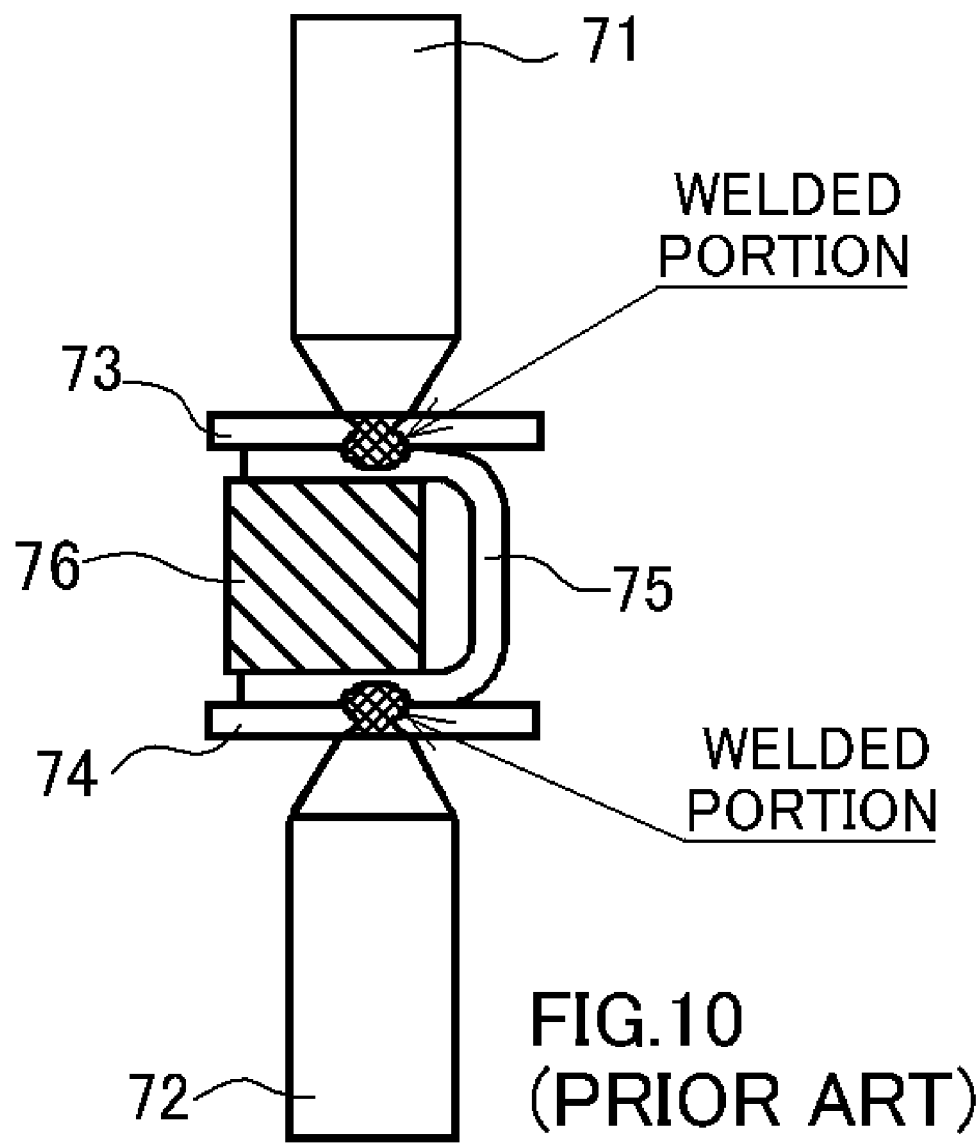
FIG. 10 is a view explaining a conventional series spot welding method.

Furthermore, in the current carrying block for the positive electrode 24B of the second embodiment, as with the current carrying block for the positive electrode 24C as a modified example shown in FIG. 6B, the current carrying block for the positive electrode could have a shape in which the chamfered face 24g is extended to the protrusion 24b and the main body 24a of the current carrying block for the positive electrode 24B of the second embodiment does not have two plane faces 24e that are parallel to each other. However, each of the two faces 24e having the protrusion 24b of the current carrying block for the positive electrode 24B is preferably exposed, that is, the two plane faces 24e that are parallel to each other are preferably formed on the main body 24a of the current carrying block for the positive electrode 24B. The reason for this is that the current carrying block for the positive electrode 24B is less deformed by the pressure from the electrodes for resistance welding during resistance welding, that a part of the protrusion 24b that is melted and deformed during resistance welding, or a part of the melted positive electrode substrate exposed portion 14 stays on the faces 24e to prevent the molten from flowing to the side face of the current carrying block for the positive electrode 24B, and that each of the faces 24e comes in contact with the positive electrode substrate exposed portion 14 to stabilize the position of the current carrying block for the positive electrode 24B. Therefore, a resistance-welded portion with higher reliability can be obtained.

Third Embodiment

The second embodiment has exemplified the current carrying block for the positive electrode 24B in which the chamfered face 24g is formed at the corner 24f between each of the two opposing faces 24e and the side face of the column-shaped main body 24a in the first embodiment as well as the protrusion 24b has no opening. Furthermore, the first embodiment has exemplified the current carrying block for the positive electrode 24A in which the opening 24c formed in the protrusion 24b has a depth D larger than the height H of the protrusion 24b (see FIG. 2B). However, the depth D of the opening 24c formed in the protrusion 24b may be smaller than the height H of the protrusion 24b. The structure of such a current carrying block for the positive electrode 24D of a third embodiment of the present invention is shown in FIG. 6C. FIG. 6C is an elevation view showing the current carrying block for the positive electrode 24D of the third embodiment.

With the current carrying block for the positive electrode 24D of the third embodiment, when the current carrying block for the positive electrode 24D is placed inside the two-divided stacked positive electrode substrate exposed portions 14 so as to bring each of the truncated-cone-shaped protrusions 24b of the current carrying block for the positive electrode 24D into contact with the positive electrode substrate exposed portions 14, the block causes less damage to the stacked positive electrode substrate exposed portions 14 and can be readily inserted to the welding position of the stacked positive electrode substrate exposed portions 14, and therefore weldability can be improved. In addition, because the opening 24c is formed inside the truncated-cone-shaped protrusion 24b, current is concentrated at the tip of the truncated-cone-shaped protrusion 24b during resistance welding, thus heat is more readily generated, weldability becomes more stable, and moreover, a sealed battery having better quality of the welded portion can be manufactured.

Fourth Embodiment

The current carrying block for the positive electrode 24E of a fourth embodiment of the present invention will be described with reference to FIG. 7. FIG. 7A is an elevation view showing the current carrying block of the fourth embodiment, FIG. 7B is a cross-sectional view of FIG. 7A, and FIG. 7C is a plan view showing an annular insulating seal material.

The current carrying block for the positive electrode 24E of the fourth embodiment includes an annular insulating seal material 26 that is made of an insulating thermally depositing resin and that is formed around the truncated-cone-shaped protrusion 24b of the current carrying block for the positive electrode 24B of the second embodiment shown in FIG. 6A. The insulating seal material 26 has a height smaller than the height H of the truncated-cone-shaped protrusion 24b.

When the current carrying block for the positive electrode 24E of the fourth embodiment is placed inside the two-divided stacked positive electrode substrate exposed portions 14 so as to bring each of the truncated-cone-shaped protrusions 24b on the current carrying block for the positive electrode 24E into contact with the stacked positive electrode substrate exposed portions 14, the block causes less damage to the stacked positive electrode substrate exposed portions 14 and can be readily inserted to the welding position of the stacked positive electrode substrate exposed portions 14 because the current carrying block for the positive electrode 24E has the chamfered face 24g, and therefore weldability can be improved.

Furthermore, in the current carrying block for the positive electrode 24E of the fourth embodiment, the annular insulating seal material 26 made of an insulating thermally depositing resin is formed around each of the truncated-cone-shaped protrusions 24b. During resistance welding, the stacked positive electrode substrate exposed portions 14 are pressed by the electrodes for resistance welding toward the current carrying block for the positive electrode 24E, thus each of the protrusions 24b of the current carrying block for the positive electrode 24E jams into the stacked positive electrode substrate exposed portions 14, and then the insulating seal material 26 comes in contact with the stacked positive electrode substrate exposed portions 14. In the case where the insulating seal material 26 is annularly formed around each of the protrusions 24b of the current carrying block for the positive electrode 24E in this manner, even when high-temperature spattered particles are generated during resistance welding, the particles with high temperature can be interrupted by the insulating seal material 26 to be captured in the insulating seal material 26, or between the protrusion 24b and the insulating seal material 24b.

Moreover, in the current carrying block for the positive electrode 24E of the fourth embodiment, high-temperature spattered particles generated during resistance welding partially melt the solid insulating thermally depositing resin to lose the heat and are rapidly cooled to reduce the temperature because the insulating seal material 26 is made of an insulating thermally depositing resin, and thus the particles are readily captured in the insulating seal material 26 made of a solid insulating thermally depositing resin. Here, because the time for applying the current is short and the area where the current is applied is small during the resistance welding, it is rare the entire insulating seal material 26 made of an insulating thermally depositing resin is melted all at once. Therefore, because the spattered particles generated during resistance welding are less dispersed from the insulating seal material 26, resulting in less of the particles entering into the flat electrode assembly, a sealed battery that rarely causes an internal short circuit and that has high reliability can be obtained.

Here, the insulating thermally depositing resin desirably has a deposition temperature of about 70 to 150° C. and a melting temperature of 200° C. or more, and moreover has chemical resistance with respect to an electrolyte and the like. For example, a rubber seal material, acid modified polypropylene, and a polyolefin-based thermally depositing resin may be used. Furthermore, examples of the insulating seal material include insulating tape with glue such as a polyimide tape, polypropylene tape, and polyphenylene sulfide tape. Moreover, the insulating seal material may be wholly made of an insulating thermally depositing resin or may have a multi-layered structure including an insulating thermally depositing resin layer.

In the first to fourth embodiments, though the current carrying block in the positive electrode side is described, the current carrying block has substantially the same function and effect in the negative electrode side except that the negative electrode substrate exposed portion 15, the negative electrode collector member 18, and the current carrying block for the negative electrode 25 have different physical properties of the materials. Furthermore, the current carrying block for resistance welding according to the invention can be used for not only the sealed battery but also various current collectors and welded structures. Furthermore, the invention may apply to one of the positive electrode side and the negative electrode side.

Furthermore, in the invention, when a sealed battery is manufactured, the protrusion 24b of the current carrying block for the positive electrode 24 may have a different shape from that of the current carrying block for the negative electrode 25. In a typical sealed battery, the positive electrode substrate employs a different metal material from that of the negative electrode substrate, for example, in a lithium ion secondary battery, the positive electrode substrate employs aluminum or an aluminum alloy and the negative electrode substrate employs copper or a copper alloy. As the copper or copper alloy has smaller electric resistance as compared with that of the aluminum or aluminum alloy, resistance welding of the negative electrode substrate exposed portion is more difficult than resistance welding of the positive electrode substrate exposed portion, and thus the stacked negative electrode substrate exposed portions sometimes have a portion that resists melting.

In such cases, the negative electrode substrate exposed portions preferably employ the current carrying block for the negative electrode 25 in which the protrusion has a portion defining an opening in order to concentrate welding current to readily resistance-weld, and furthermore, the positive electrode substrate exposed portions preferably employ the current carrying block for the positive electrode 24 in which the opening is not formed in the protrusion 24b in order to less deform the current carrying block for the positive electrode 24 because resistance welding readily progresses.

In order to simplify the explanation, the embodiments and the drawings are so exemplified that one current carrying block is welded with respect to one of the electrode substrates. However, it should be understood that a plurality of current carrying blocks may be used and the number of current carrying blocks can be determined as necessary according to required output power of a battery and the like.

What is claimed is:

1. A method for manufacturing a sealed battery, the method comprising:
   (1) winding or stacking a positive electrode sheet and a negative electrode sheet with a separator interposed therebetween to make a flat electrode assembly having a plurality of positive electrode substrate exposed portions at one end and a plurality of negative electrode substrate exposed portions at the other end;
   (2) dividing at least one of the stacked positive electrode substrate exposed portions and the stacked negative electrode substrate exposed portions into two;
   (3) placing a collector member or a welding receiving member on each of outermost surfaces of the two-divided substrate exposed portions, and placing a current carrying block including a first protrusion on one face of a metal block and a second protrusion on another face, the faces opposing each other, between the two-divided substrate exposed portions to bring each of the protrusions on the two opposing faces into contact with each of the two-divided substrate exposed portions;
   (4) bringing a pair of electrodes for resistance welding into contact with the collector members or the welding receiving members placed on both of the outermost surfaces of the two-divided substrate exposed portions; and
   (5) performing resistance welding with pressure applied between the pair of electrodes for resistance welding.

2. The method for manufacturing a sealed battery according to claim 1, wherein a corner between each of the two opposing faces and a side face of the metal block is chamfered in the current carrying block.

3. The method for manufacturing a sealed battery according to claim 2, wherein the chamfered portion in the metal block has a flat surface in the current carrying block.

4. The method for manufacturing a sealed battery according to claim 2, wherein the two faces having the protrusions of the metal block have flat portions that are parallel to each other in the current carrying block.

5. The method for manufacturing a sealed battery according to claim 1, wherein the protrusions each have a truncated cone or pyramid shape in the current carrying block.

6. The method for manufacturing a sealed battery according to claim 1, wherein the protrusions each have a portion defining an opening in the current carrying block.

7. The method for manufacturing a sealed battery according to claim 6, wherein the opening is extended to reach inside the metal block in the current carrying block.

8. The method for manufacturing a sealed battery according to claim 7, wherein the opening penetrates through the metal block in the current carrying block.

9. The method for manufacturing a sealed battery according to claim 1, wherein an insulating seal material is annularly formed around the protrusions in the current carrying block.

10. The method for manufacturing a sealed battery according to claim 1, wherein the protrusions corresponding to the positive electrode substrate exposed portions and the negative electrode substrate exposed portions have different shapes in the current carrying block.

11. The method for manufacturing a sealed battery according to claim 6, wherein the opening in the protrusion is collapsed to form a cavity inside the protrusion as well as the collapsed part is centered in the protrusion by the pressure applied in the resistance welding with pressure applied between the pair of electrodes for resistance welding.

* * * * *